(12) United States Patent
Schnitter et al.

(10) Patent No.: US 8,029,762 B2
(45) Date of Patent: Oct. 4, 2011

(54) POROUS ANODE BODIES COMPRISING NIOBIUM SUBOXIDE AND CAPACITORS CONTAINING SUCH ANODE BODIES

(75) Inventors: Christoph Schnitter, Holle (DE); Holger Brumm, Goslar (DE); Christine Rawohl, Goslar (DE); Colin McCracken, Sinking Springs, PA (US)

(73) Assignee: H. C. Starck GmbH, Goslar (DE)

( * ) Notice: Subject to any disclaimer, the term of this patent is extended or adjusted under 35 U.S.C. 154(b) by 730 days.

(21) Appl. No.: 11/916,361

(22) PCT Filed: Jun. 1, 2006

(86) PCT No.: PCT/EP2006/005220
§ 371 (c)(1),
(2), (4) Date: Feb. 12, 2008

(87) PCT Pub. No.: WO2006/128698
PCT Pub. Date: Dec. 7, 2006

(65) Prior Publication Data
US 2008/0212263 A1   Sep. 4, 2008

(30) Foreign Application Priority Data

Jun. 3, 2005  (GB) .................................. 0511321.2
Feb. 6, 2006  (GB) .................................. 0602330.3

(51) Int. Cl.
*C01G 33/00* (2006.01)
(52) U.S. Cl. ................... 423/594.17; 423/265; 428/662; 428/702; 428/472; 419/19; 361/508; 361/523; 361/528; 361/529; 361/532; 29/25.03
(58) Field of Classification Search .................. 428/702, 428/662, 472; 423/265, 62, 594.17; 361/508, 361/523, 528, 529, 532; 419/19; 29/25.03
See application file for complete search history.

(56) References Cited

U.S. PATENT DOCUMENTS

| 6,373,685 | B1 * | 4/2002 | Kimmel et al. ............... 361/508 |
| 6,391,275 | B1 * | 5/2002 | Fife ............................. 423/594.8 |
| 6,416,730 | B1 * | 7/2002 | Fife ............................. 423/594.8 |
| 7,410,609 | B2 * | 8/2008 | Schnitter ........................ 419/19 |
| 2005/0018384 | A1 | 1/2005 | Schnitter |
| 2005/0084445 | A1 | 4/2005 | Kimmel et al. |

FOREIGN PATENT DOCUMENTS

| EP | 1357086 A1 | 10/2003 |
| EP | 1388870 A1 | 2/2004 |
| WO | WO-02/45107 A1 | 6/2002 |
| WO | WO-2004/076355 A1 | 9/2004 |

OTHER PUBLICATIONS

"Standard Test Method for Flow Rate of Metal Powders", ASTM International, Designation: B 213-03, 2001.
"Standard Test Method for Particle Size Distribution of Metal Powders and Related Compounds by Light Scattering", ASTM, Designation B 822-97, 2001.
"Standard Test Method for Surface Area of Catalysts and Catalyst Carriers", ASTM International, Designation: D 3663-03, 2001.
"Standard Test Method for Apparent Density of Metal Powders and Compounds Using the Scott Volumeter", ASTM International, Designation: B 329-06, 2001.

* cited by examiner

*Primary Examiner* — Steven Bos
(74) *Attorney, Agent, or Firm* — Connolly Bove Lodge & Hutz LLP

(57) ABSTRACT

Porous anode bodies suitable for use in solid state capacitors, the porous anode bodies prepared by processes which include providing a niobium suboxide powder comprising niobium suboxide particles having a bulk nitrogen content of 500 to 20,000 ppm, and agglomerating and coalescing the powder; and capacitors incorporating such anode bodies.

19 Claims, 5 Drawing Sheets

POROUS ANODE BODIES COMPRISING NIOBIUM SUBOXIDE AND CAPACITORS CONTAINING SUCH ANODE BODIES

CROSS-REFERENCE TO RELATED APPLICATIONS

This application is a national stage application, under 35 U.S.C. §371, of PCT/EP2006/005220, filed Jun. 1, 2006, which claims priority of British Patent Application No. GB 0511321.2, filed Jun. 3, 2005, and British Patent Application No. GB 0602330.3, filed Feb. 6, 2006.

BACKGROUND OF THE INVENTION

The present invention concerns a solid electrolyte capacitor comprising a nitrogen containing niobium suboxide powder, which exhibits higher break down voltage, higher temperature of operation and elongated lifetime.

Solid electrolyte capacitors useful in mobile communication devices generally comprise an electrically conductive carrier of high specific surface, covered by a non-conductive niobium or tantalum pentoxide layer taking advantage from the high stability and high dielectric constant of the valve metal oxide, wherein the isolating pentoxide layer can be generated by electrolytic oxidation at very constant thickness. The valve metal or conductive lower oxides (suboxides, $NbO_x$) of the valve metals are used as the carrier material. The carrier, which forms one of the electrodes (anode) of the capacitor generally has a highly porous sponge-like structure which is generated by sintering of very fine primary structures or sponge-like secondary structures. The surface of the conductive carrier structure is electrolytically oxidized ("forming"), whereby the thickness of the isolating pentoxide layer is determined by the maximum voltage of the electrolytic oxidation ("forming voltage"). The counter electrode is generated by soaking of the sponge-like surface-oxidized structure with manganese nitrate, which is thermally transformed into manganese dioxide, or, by soaking of a liquid precursor of a polymer electrolyte (e.g. PEDT, polypyrrole) and polymerisation thereof. Electrical terminals are a tantalum or niobium wire sintered with the sponge-like structure at the anode side and the metallic housing of the capacitor, which is isolated against the wire at the cathode side.

The capacitance C of the capacitor is calculated according to the formula $$C=(F\cdot\in)/(d\cdot V_F),$$

wherein F is the active surface of the capacitor, $\in$ is the dielectric constant of the pentoxide layer, d is the thickness of the isolating pentoxide layer per Volt forming voltage, and $V_F$ is the forming voltage. The ratio $\in/d$ is nearly equal for tantalum pentoxide and niobium pentoxide (1.64 resp. 1.69), although $\in$ (27.6 resp. 41) and d (16.6 resp. 25 A/V) differ appreciably. Accordingly, capacitors on basis of both the pentoxides having the same geometrical structure have the same capacitance. Specific capacitances per weight differ due to the different densities of Nb, $NbO_x$ and Ta respectively. Carrier (anode) structures of Nb or $NbO_x$, accordingly, do have the advantage of saving weight, when used in mobile phones, where reduction of weight is one of the objects. Regarding costs, $NbO_x$ is more feasible than Nb, providing part of the volume of the anode structure from oxygen.

An important quality criterion is life time of the capacitor, which depends from the voltage of operation thereof and decreases with increasing voltage. For opening up a wider range of applications, it would be desirable to increase the lifetime, particularly in the upper voltage of operation level.

Furthermore it would be desirable to allow for an increase of the temperature of operation. Presently, the temperature of operation of capacitors based on NbO is limited to about 125° C. A higher allowable temperature of operation would open up the use of capacitors on basis of NbO in the automotive industry.

Furthermore, with reference to safety aspects, it would be desirable to increase the breakdown voltage, and to slow down the burning rate, and to reduce the generation of heat during burning after ignition, of the sintered anode structures and of the capacitors.

BRIEF SUMMARY OF THE INVENTION

It is an object of the invention to provide a capacitor made of niobium suboxide exhibiting improved properties allowing for higher temperature of operation.

Another object of the invention is to provide a capacitor made of niobium suboxide exhibiting increased breakdown voltage.

Another object of the invention is to provide an anode structure made of niobium suboxide powder, and a capacitor comprising said anode structure with reduced burning rate and reduced generation of heat, when ignited.

The present invention thus relates to a porous anode body for use in solid state capacitor obtainable from a Niobium suboxide powder comprising niobium suboxide particles having a bulk nitrogen content of between 500 to 20,000 ppm preferably 1000 to 10,000 ppm, more preferably between 200 and 8000 ppm, and still more preferably 3000 to 5000 ppm, said powder having been agglomerated and coalesced to form a unitary porous anode body.

In the porous anode body according to the invention, the nitrogen is preferably at least partly present in the form of $Nb_2N$ crystals or niobium oxynitride $NbO_xN_y$ crystals.

In the porous anode body according to the invention the $Nb_2N$ crystals preferably have a size sufficiently to give a peak in $Cu_{K\alpha}$-x-ray radiation at 2Θ-angle of about 38.5°.

In the anode body according to the invention, the height of the $Nb_2N$ peak at about 2Θ=38.5° is preferably between 2 to 25% of the height of the NbO peak at 2Θ=30°.

In the porous anode body according to the invention, preferably the $CU_{K\alpha1}$-peak at about 2Θ=38.5° has a half-value width of between 0.05 and 0.2°.

The porous anode body according to the invention, preferably comprises the niobium suboxide powder wherein the particles are agglomerates of primary particles of a mean diameter of 0.1 to 1.5 μm, preferably 0.3 to 1.0 μm. The niobium suboxide has the composition $NbO_x$ with 0.7<x<1.3, preferably 1<x<1.033. The oxygen content is between 14.5 to 15.1 wt-%.

The porous anode body according to the invention, may be obtained from a niobium suboxide powder having the properties as mentioned above that has a burning time of more than 5 min, when 50 g thereof are arranged in an area of 150×30 mm on a niobium sheet of 0.1 mm thickness and ignited at one end.

The porous anode body according to the invention is suitable for the manufacture of electrolyte capacitors.

The porous anode body according to the invention comprises niobium suboxide powder agglomerated and coalesced to form a unitary porous body, in which the niobium suboxide in the body has a bulk nitrogen content of between 500 to 20,000 ppm. The porous anode body is preferably being formed by moulding and sintering said powder.

The present invention also relates to a solid state capacitor comprising a porous anode body as described above.

A solid state capacitor according to the present invention usually also comprises a dielectric layer formed on surfaces throughout said porous anode body, and a conductive cathode layer formed on said dielectric layer.

In the capacitor according to the invention, the anode body and cathode layer are preferably electrically connected to respective anode and cathode terminals of the capacitor. In general, such a capacitor may be encapsulated in an insulating material, but for exposed anode and cathode terminal surfaces.

The capacitor according to the present invention can be advantageously used in electric or electronic devices. Examples of such devices are electric or electronic device selected from the group consisting of telephones, radios, television sets, computers and battery rechargers.

BRIEF DESCRIPTION OF THE DRAWINGS

The foregoing summary, as well as the following detailed description of the invention, may be better understood when read in conjunction with the appended drawings. For the purpose of assisting in the explanation of the invention, there are shown in the drawings representative embodiments which are considered illustrative. It should be understood, however, that the invention is not limited in any manner to the precise arrangements and instrumentalities shown.

In the drawings.

DETAILED DESCRIPTION OF THE INVENTION

Figure 1:
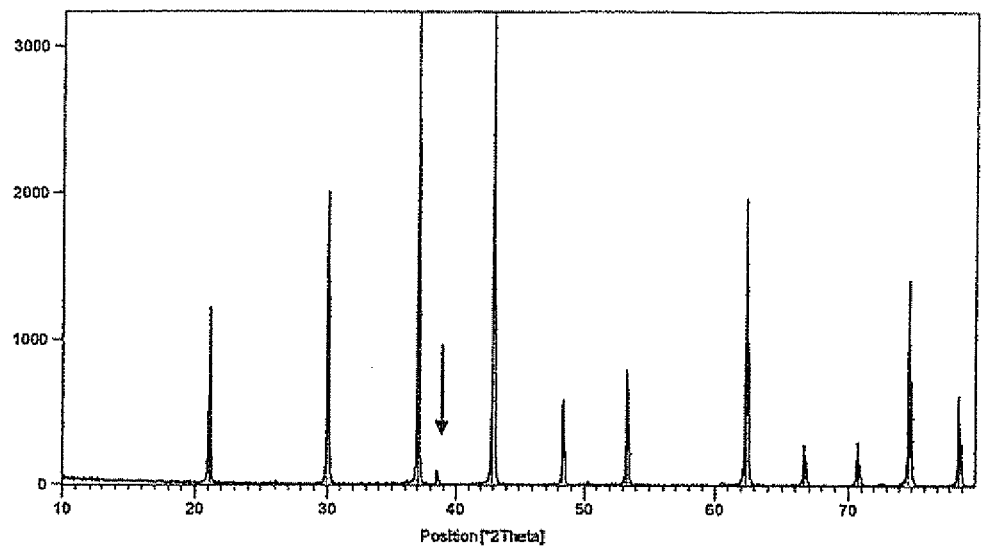
FIG. 1 is an x-ray diffraction pattern of a powder in accordance with an embodiment of the invention.

The anode body consists of niobium suboxide comprising niobium suboxide particles having a bulk nitrogen content of between 500 to 20,000 ppm, preferably 1000 to 10,000 ppm. More preferred is a nitrogen content between 2000 and 8000 ppm, particularly preferred 3000 to 5000 ppm.

Preferably the nitrogen is present in the niobium oxide powder according to the invention at least partly in the form of crystalline $Nb_2N$ or niobium oxynitride $NbO_xN_y$.

It is well known in the technology of tantalum capacitors that surface nitrogen has a positive effect on sintering of tantalum powder, also improving leakage current of tantalum capacitors. Contrary to this, an important aspect of the present invention is that the nitrogen is quasi homogeneously distributed in the bulk of the powder particles preferably at least partly in the form of very small $Nb_2N$ crystal domains, in an amount and size sufficiently large that a peak at a 2Θ-angle of about 38.5° (101-reflex of $Nb_2N$) can be detected when investigated by x-ray diffraction method using $CU_{K\alpha}$-radiation.

Preferably, the height of the $Nb_2N$ peak at about 2Θ=38.5° is less than 25% of the height of the NbO peak at 2Θ=30° (110-reflex of NbO), particularly less than 15% of the height of the NbO-peak at 2Θ=30°.

Furthermore preferred powders show an $CU_{K\alpha}$-x-ray peak at 2Θ=38.5°, the height of which is at least 2%, preferably at least 5%, of the height of the NbO-peak at 2Θ=30°.

In the higher range of nitrogen content additional crystalline nitride phases such as niobium nitride or niobium oxynitride may be detectable. More specifically, $Nb_4N_3$, $NbN_{0.77}$, $Nb_{0.77}N_{0.091}$, $NbN_{0.64}$, $NbN_{0.9}$, $NbN_{0.95}$, $Nb_{4.62}N_{2.14}$, $Nb_4N_{3.92}$, $Nb_4N_5$, $Nb_5N_6$, $NbN_{0.801}$, NbN etc or mixtures thereof, or niobium oxynitrides, like $NbN_{0.6}O_{0.3}$, $NbN_{0.6}O_{0.2}$, $NbN_{0.9}O_{0.1}$, $Nb(N,O)$ etc, or mixtures thereof with each other or niobium nitrides, may be detectable. In particular, $NbN_{0.77}$, $NbN_{0.95}$, NbN etc, or niobium oxynitride, may be detectable.

The half-value width of the $Cu_{K\alpha 1}$-peak at about 2Θ=38.5° ((101)-peak of $Nb_2N$) preferably is between 0.05° and 0.2°, preferably 0.07 and 0.15°, as determined with an goniometer type Panalytical X Pert MPD PW 3050, anode Cu at 50 kV and 40 mA, having a divergence slit and anti scatter slit of ½°2Θ each, a receiving slit of 0.2 mm, soller slits of 0.04 rad, a beam mask of 20 mm, the detector being proportional Xe filled. The scanning program is step size 0.01°2Θ with scan speed of 0.001°2Θ/sec between 37.7 and 39.5°2Θ. The $Cu_{K\alpha 2}$ reflex is striped.

Preferably, the anode body according to the present invention has been obtained from a niobium suboxide material having a grain size distribution characterized by a D10-value of between 50 and 90 μm, a D50-value of between 150 and 210 μm, and a D90-value of between 250 to 350 μm, as determined according to ASTM B 822 ("Mastersizer", wetting agent Daxad 11). Particularly preferred powders having spherical or elliptical grains providing for good flowability of less than 80 sec/25 g, preferably 60 sec/25 g, particularly preferred 40 sec/25 g, as determined according to ASTM B 213 ("Hall flow") can be employed. The bulk density of such powders are in general from between 0.5 and 2 g/cm³, preferably 0.9 and 1.2 g/cm³ (14.8 to 19.7 g/inch³), as determined according to ASTM B 329 ("Scott density").

The anode body according to the invention can be obtained from individual grains or particles of the niobium suboxide powder that are highly porous agglomerates of dense primary particles of mean size having a smallest cross sectional diameter of 0.1 to 1.5 μm, preferably 0.3 to 1.0 μm. The primary particles may have spherical, chip-like or fibrous structure. Preferably the smallest cross sectional diameter of the primary particles is between 0.4 and 1 μm.

The porosity of anodes sintered from the powder according to the invention, as determined by mercury intrusion, preferably is between 50 and 70% by volume, particularly preferred between 53 and 65% by volume. More than 90% of the pore volume consists of pores having a diameter of 0.2 to 2 μm.

The broad pore distribution curve has steep flanks at both sides with a minimum in the range of twice the primary particle diameter.

Generally, specific surface area of the powders to be used for producing the porous anode body according to the invention preferably is between 0.5 and 12.0 $m^2/g$, preferably 0.6 to 6 $m^2/g$, more preferably 0.7 to 2.5 $m^2/g$, as determined according to ASTM D 3663 ("BET-surface"), particularly preferred is a specific surface of between 0.8 and 1.3 $m^2/g$ or of between 0.8 and 1.2 $m^2/g$.

Capacitors made from the porous anode body according to the invention may have a specific capacitance of between 40,000 to 300,000 μFV/g, commonly between 60,000 and 200,000 μFV/g.

Preferred niobium suboxide powders that can be employed for manufacturing a porous anode body according to the invention have a composition according to the formula $NbO_x$ with $0.7<x<1.3$, corresponding to an oxygen content of between 10.8 and 18.3% by weight, particularly preferred is $1.0<x<1.033$, or powders having an oxygen content of between 14.5 to 15.1% by weight.

Generally, impurities in the porous anode body according to the invention should be as low as possible, particularly harmful impurities in capacitor application such as Fe, Cr, Ni, Cu, Na, K, and Cl, are less than 15 ppm each. Preferably the sum of those harmful impurities is less than 35 ppm. The carbon content preferably is less than 40 ppm. Other less harmful impurities such as Al, B, Ca, Mn, and Ti are preferably present in an amount of less than 10 ppm, Si less than 20 ppm. Mg may present in an amount of up to 500 ppm.

Phosphorous generally is not harmful. In niobium metal and tantalum metal powders for capacitors, phosphorous doping is used for reducing the sintering activity of the powders. A reduction of sintering activity of the niobium suboxide powders according to the invention is normally not desirable. Preferably the phosphorous content accordingly is below 10 ppm. If necessary the substantially phosphorous free powders may be treated with phosphorous acid, ammonium hydrogen phosphate or ammonium phosphate solution prior to sintering.

Tantalum may be present as an alloying component substituting niobium according to formula $(Nb,Ta)O_x$.

The nitrogen containing niobium suboxide powder suitable for producing a porous anode body according to the invention can be produced by a process that starts from a niobium metal powder precursor wherein the niobium metal precursor is nitrided before transformation to niobium suboxide, which can be carried out by various known methods for the transformation of niobium metal powder into NbO. One known method is the solid state disproportionation method: The niobium metal powder is mixed with a stoichiometric amount of niobium oxide, which is oxidized higher than the desired product, such as $Nb_2O_5$ or $NbO_2$, and thereafter the mixture is heated to a temperature sufficient to initiate disproportionation in a non-oxidizing atmosphere (e.g. a reducing inert gas atmosphere such as hydrogen or argon/hydrogen mixtures) for a time sufficient to give a homogeneous oxygen distribution, e.g. for several hours. Preferably, the metal precursor as well as the oxide precursor consists of primary particles of about 1 μm diameter or less (smallest cross section, if non-spherical).

For the nitridation of the niobium metal precursor powder (doping of the metal with nitrogen) the metal powder is mixed with a solid nitrogen containing compound, such as $Mg(N_3)_2$ or $NH_4Cl$, or treated with an aqueous solution thereof, and heated in an inert atmosphere, or reacted with a gaseous nitrogen containing reactant, such as $N_2$ or $NH_3$ at appropriate temperature (e.g. 400 to 750° C.), which can also be supplied in an inert gas atmosphere, such as argon, at a ratio of 15 to 30%. The amount of nitrogen doping is controlled by properly selecting time and temperature of the heat treatment.

According to another method, nanocrystalline niobium nitride may be mixed at the required ratio with niobium metal powder and heat treated at between 400 and 900° C. in an inert gas atmosphere for nitridation of the metal powder.

The niobium metal powder precursor and the higher oxidized oxide precursor may be mixed prior to the nitridation, which allows for reduction of handling. In this case, after completion of the nitridation, the atmosphere is exchanged and the mixture is further heated to the temperature where the solid state disproportionation occurs.

Extremely pure $Nb_2O$, which may be used as the oxide precursor of the invention, is available from precipitation of the niobium hydroxide from an aqueous $H_2NbF_7$ solution by addition of an aqueous $NH_4OH$ solution and calcinations of the niobium hydroxide separated from the solution.

The niobium metal precursor preferably is obtained from extremely pure $Nb_2O_5$ by reduction. This may occur by aluminothermic reduction, i.e. igniting a $Nb_2O_5/Al$ mixture, washing out the aluminiu, oxide there from and purification of the niobium metal by electron beam heating. The niobium metal ingot obtained thereby may be made brittle by diffusion of hydrogen in a known manner and milled to give a powder having a chip like particle shape.

A suitable process to reduce the pentoxide to metal is the two-stage process disclosed in WO 00/67936. According to this process the pentoxide is first reduced to approximately niobium dioxide and in the second stage to niobium metal with magnesium vapour at about 900 to 1100° C. Magnesium oxide, which is formed during reduction, may be removed by acid leaching. However it is not necessary to remove the magnesium oxide prior to nitridation and transformation of the mobium metal to $NbO_x$. In the contrary, the presence of magnesium oxide during the transformation to $NbO_x$ has a positive influence on the porosity of the $NbO_x$ powder.

The grain size (secondary particle size) of the powder particles may be adjusted by properly selecting the temperature at which the solid state disproportionation is carried out or later by a sintering heat treatment of the product in an argon atmosphere and screening.

The invention is now explained in more detail by way of the following examples:

A. Precursors: The following precursors were used:

A1: High purity $Nb_2O_5$ with the following analytical data:
Al: 1 ppm
Cr: <0.3 ppm
C: <10 pp
Fe: <0.5 ppm
K: 0.6 ppm
Mg: <1 ppm
Mn: <0.1 ppm
Mo: <0.3 ppm
Na: 3 ppm
Ni: <0.2 ppm
Si: 14 ppm
Scott density: 12.2 g/inch$^3$.

A2: $NbO_2$ obtained from reduction of precursor A1 ($Nb_2O_5$) with the following analytical data:
Al: 2 ppm
Cr: <2 ppm
C 12 ppm
Fe: <2 ppm
K: 1 ppm
Mo: 54 ppm Na: 4 ppm
Ni: <2 ppm
N: <300 ppm
O: 26.79%
Si: 14 ppm
BET: 0.17 m²/g
Scott density: 23.6 g/inch³

A3: Niobium metal: The precursor A2 (NbO₂) is reduced with magnesium vapour according to WO 00/67936 to yield the niobium metal surface with the following analytical data:
Al: 2 ppm
Cr: <2 ppm
C <10 ppm
Fe: <2 ppm
K: 1 ppm
Mg: 28.14%
Mo: 41 ppm
Na: 2 ppm
Ni: <2 ppm
N: <300 ppm
O: 18.74%
Si: 7 ppm A4: Niobium metal obtained by washing precursor A3 (magnesium oxide containing niobium metal) with sulphuric acid and rinsed with water until neutral. The analytical data are as follows:
Al: 3 ppm
Cr: <2 ppm
C <10 ppm
Fe: <2 ppm
K: 1 ppm
H: 344 ppm
Mg: 750 ppm
Mo: 75 ppm
Na: 3 ppm
Ni: <2 ppm
N: <300 ppm
O: 1.65%
Si: 8 ppm
BET: 4.52 m²/g If "<" is presented in the analytical data, the respective content is below the analytical limit and the figure behind represents the analytical limit.

POWDER PRODUCTION EXAMPLES

Example 1

53.98 weight-% of precursor A4 (Nb) and 46.02 weight-% of precursor A1 (Nb₂O₅) are homogeneously mixed and heated in a hydrogen atmosphere to 1400° C. The product properties are shown in table 1.

Example 2

Precursor A4 (Nb) is homogeneously mixed with 1.5 times the stoichiometric amount of magnesium (with reference to the oxygen content) and 5.4 parts by weight of NH₄Cl (per 100 parts Nb) and placed in reactor. The reactor is then rinsed with argon and heated to 700° C. for 90 minutes. After cooling down the reactor is slowly filled with air for passivation. After washing with sulphuric acid and rinsing a nitrogen doped niobium metal has been obtained, containing between 9600 and 10500 ppm nitrogen (average 9871 ppm). The oxygen content is 6724 ppm.

The nitrogen doped niobium is transformed to NbO in the same manner as in example 1. The product properties are shown in table 1. The x-ray diffraction pattern of the powder is shown in FIG. 1. Clearly, the Nb₂N (101)-peak at 2Θ=38.5° indicated by the arrow can be recognized. Accordingly, at least part of the N-doping is present in the form of a crystalline Nb₂N phase.

Example 3

Example 2 was repeated with the deviation that the addition of NH₄Cl was increased to 8.2 parts by weight. The niobium powder has an average nitrogen content of 14730 ppm. The oxygen content is 6538 ppm. The suboxide product properties are shown in table 1.

Example 4

Figure 2:
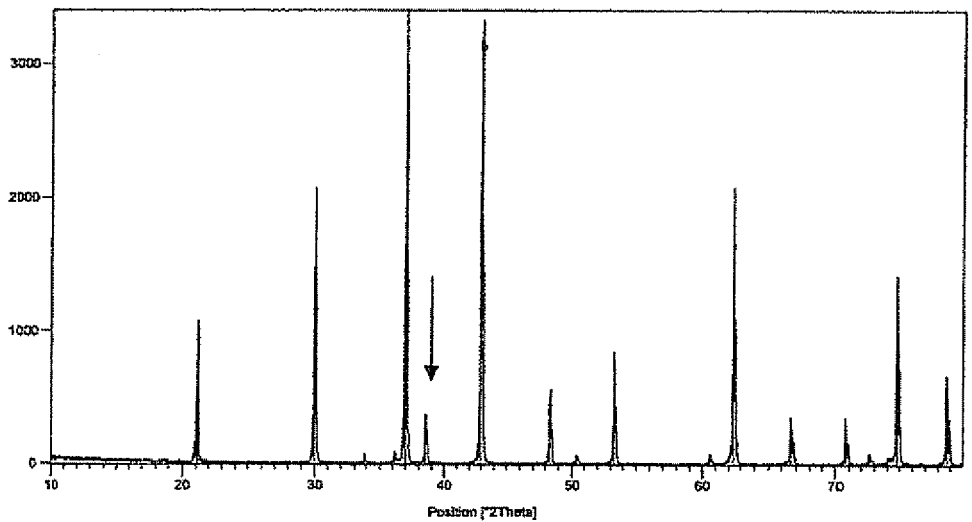
FIG. 2 is an x-ray diffraction pattern of a powder in accordance with another embodiment of the invention.

53.95 parts by weight of precursor A4 (Nb) and 46.05 parts by weight of precursor A1 (Nb₂O₅) are mixed homogeneously and placed in a reactor. The reactor was rinsed with argon and heated to 500° C. Thereafter the reactor was three times with an 80% Ar/20% N-mixture for 30 minutes each time. Thereafter powder mixture is heated to 1450° C. in hydrogen atmosphere. The product properties are shown in table 1. The x-ray diffraction pattern of the powder is shown in FIG. 2. Clearly, the Nb₂N-(101)-peak indicated by the arrow at 2Θ=38.5° can be recognized.

Example 5

Precursor A3 (MgO containing Nb) is nitrided with nitrogen gas at 630° C. and thereafter magnesium oxide and residual magnesium metal removed by washing with 15% sulphuric acid. The oxygen content of the resulting niobium metal is 1.6% b.w.; the nitrogen content is 8515 ppm.

Figure 3:
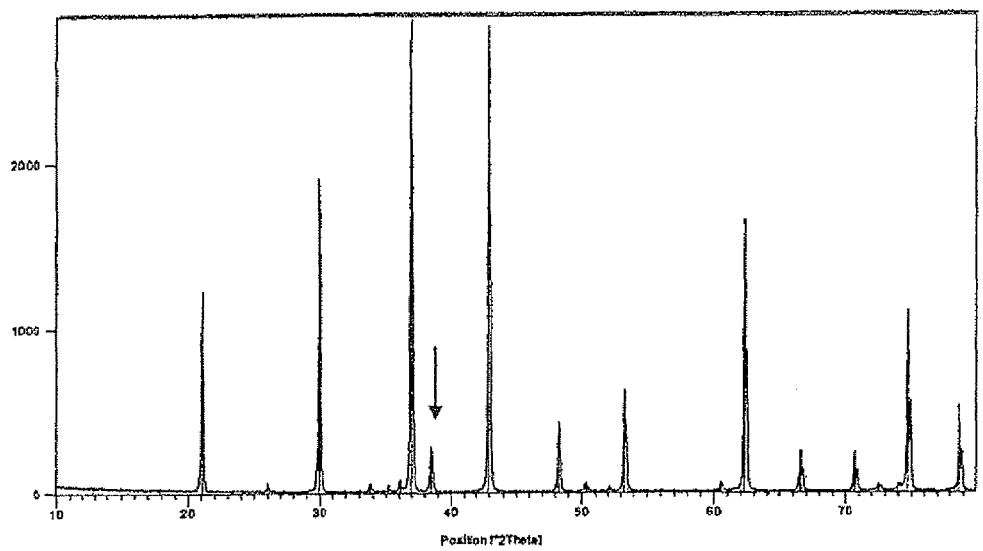
FIG. 3 is an x-ray diffraction pattern of a powder in accordance with another embodiment of the invention.

56.03 parts by weight of the N-doped niobium metal and 43.97 parts by weight of precursor A1 (Nb₂O₅) are mixed homogeneously and heated to 1100° C. in a hydrogen atmosphere. The product properties are shown in table 1. The x-ray diffraction pattern of the powder is shown in FIG. 3. Clearly, the Nb₂N-(101)-peak at 2Θ=38.5° can be recognized.

TABLE 1

Properties of NbO powders

| Example No. | BET m²/g | Mastersizer D10 μm | Mastersizer D50 μm | Mastersizer D90 μm | Scott density g/inch³ | Hall flow sec | Analysis O % b.w. | Analysis N ppm |
|---|---|---|---|---|---|---|---|---|
| 1(comp) | 1.02 | 60.52 | 190.63 | 295.4 | 15.8 | 48 | 14.97 | <300 |
| 2 | 1.04 | 62.06 | 170.67 | 290.05 | 17.2 | 43 | 14.9 | 5848 |
| 3 | 1.03 | 59.73 | 185.54 | 270.76 | 16.7 | 54 | 14.93 | 8115 |
| 4 | 1.0 | 58.73 | 191.04 | 299.93 | 14.7 | 45 | 14.98 | 6281 |
| 5 | 2.31 | 52.76 | 150.46 | 268.37 | 15.2 | 61 | 14.94 | 5062 |

Example 6

Precursor A2 (NbO₂) is placed within a reactor on a sieve made from niobium wire. Below the sieve is a crucible containing 1.05 times the stoichiometric amount magnesium with reference to the oxygen content of the NbO₂. Argon is continuously introduced at the bottom of the reactor and removed from the reactor on top. Then the reactor is heated to about 950° C. After consumption of the magnesium the reactor is cooled down to 575° C. and nitrogen is introduced for 3 hours. After cooling down, passivation and removal of magnesium oxide and residual magnesium metal a nitrogen doped niobium metal is obtained, which can be used for transformation to NbO.

Determination of the Burning Rate:

50 g of each powders of examples 1 (comparison), 2 an 3 were arranged on a niobium sheet of 0.1 mm thickness in an array of 150×30 mm. The powder arrays were ignited at one end and the time for complete burning was measured (in air):

| | | |
|---|---|---|
| powder of example 1 (comparison): | burning time | 3 min 35 sec, |
| powder of example 2 | burning time | 6 min 25 sec, |
| powder of example 3 | burning time | 8 min 10 sec. |

Figure 4:
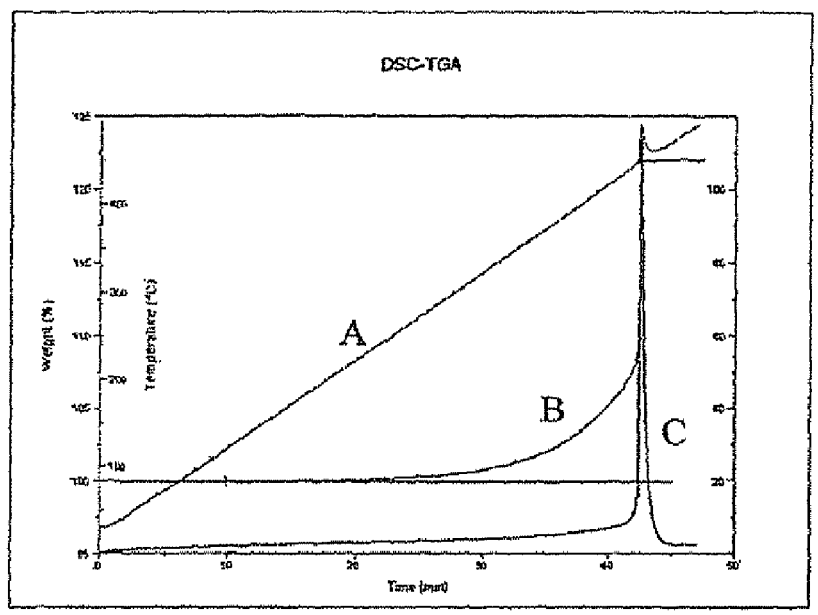
FIG. 4 is a graphical comparison of differential scanning calorimetry/thermogravimetric analysis (DSC/TGA) of a powder in accordance with an embodiment of the invention.
Figure 5:
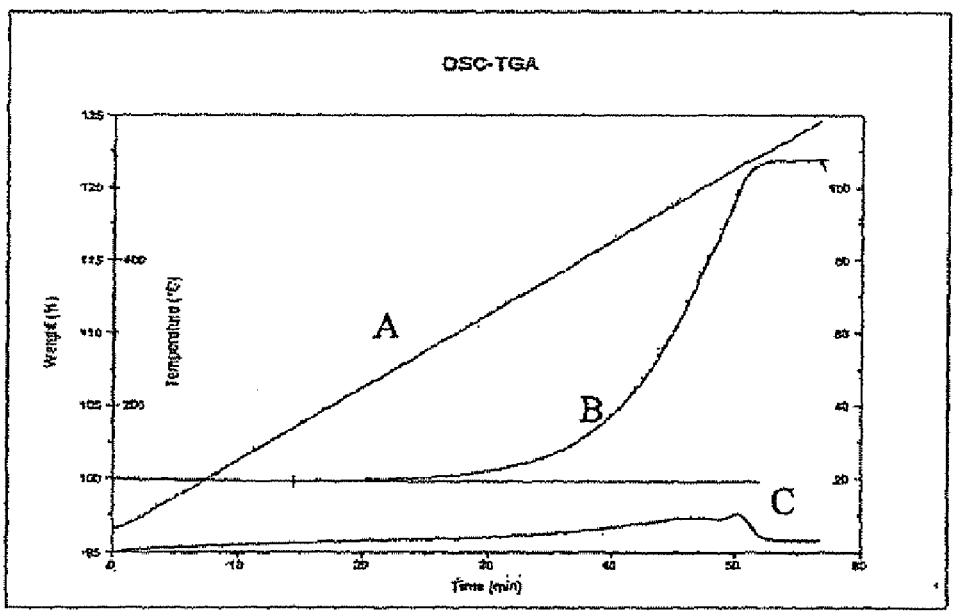
FIG. 5 is a graphical comparison of differential scanning calorimetry/thermogravimetric analysis (DSC/TGA) of a powder in accordance with another embodiment of the invention.

DSC/TGA Investigation:

A sample of example 1 and a sample of example 2 were heated in air from 25 to 600° C. and the increase of weight measured by thermo gravimetry (TGA). Simultaneously the heat flow accompanied therewith was measured by the DSC method. FIG. 4 shows respective curves for the powder of example 1 (comparison) and FIG. 5 shows the respective curves for the powder of example 2. In those Figs. curve A indicates the temperature (left inner scale from 0 to 600° C.), curve B indicates weight-% (left outer scale from 95 to 125%), and curve C indicates the heat flow with correction for weight (right scale from 0 to 120 W/g) over time (horizontal scale from 0 to 50 resp. 60 sec.), each. Both samples show a slight increase in weight above about 200° C. with small heat development. Until about 450° C. weight increase and exothermic heat is very similar for both samples. Above about 450° C. the nitrogen free sample suffers a sudden increase in weight and corresponding strong development of heat (FIG. 5), whereas for the nitrogen containing sample heat development and weight increase rate remain moderate also above 450° C. with no exothermic peak.

Preparation of Anodes

The $NbO_x$ powder of example 1 and example 2 respectively are filled into cylindrical press moulds of 4.1 mm diameter and 4.2 mm length around an axially arranged tantalum wire. The powder is pressed to green bodies having a density of 2.8 g/cm³. The green bodies were placed on a niobium tablet and heated to 1460° C. in a vacuum of $10^{-8}$ bars for a holding time of 20 minutes.

Investigation of the Break Down Voltage of Anodes

The anodes are immersed into an aqueous 0.1% phosphoric acid solution (conductivity 8600 μS/cm) at a temperature of 85° C. and a constant current of 150 mA is applied for forming until voltage suddenly drops down (break through voltage). The anodes made from powder of example 1 (comparison) gave a sudden voltage drop at 96 V, whereas the anodes made from powder of example 2 gave a sudden voltage drop at 104 V.

Investigation of Capacitors

Figure 6:
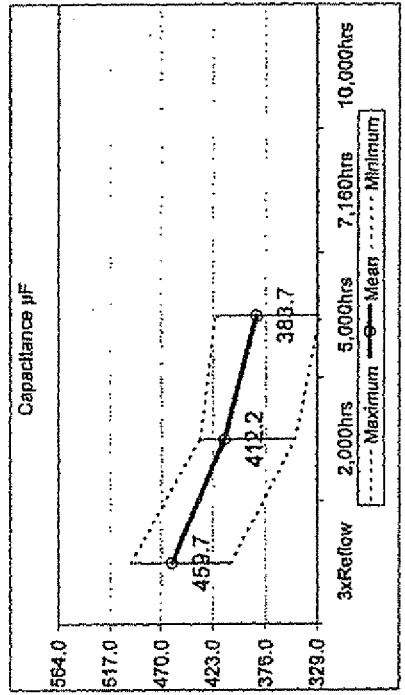
FIGS. 6a and 6b are graphical representations of the leakage current and capacitance at a working voltage of 4V, respectively, of a capacitor comprised of a powder in accordance with an embodiment of the invention.
Figure 6:
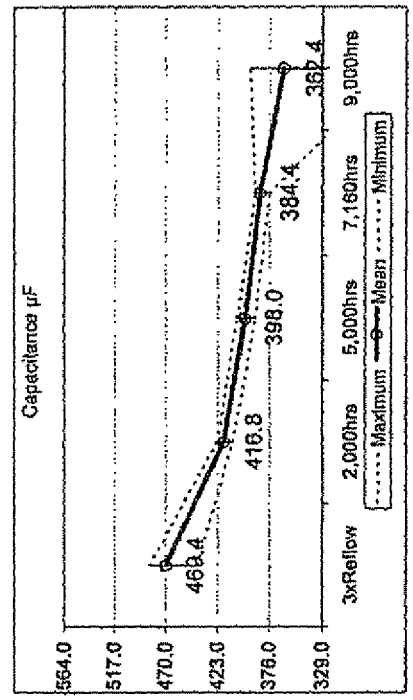

In an industrial production line capacitors were produced from the powder of example 1 (comparison) as well as from powders of example 2. The powders are pressed in pressing moulds of 4.2 mm diameter and 4.1 mm length around a centrally arranged tantalum wire at press density of 2.8 g/cm³. The green bodies were sintered in a vacuum of $10^{-8}$ bars. The anode structures are anodised to a forming voltage of 16 V and provided with a $MnO_2$-cathode. The anodes are operated at constant temperature and with an alternating current of the working voltage as presented hereafter. 50 capacitors were run in parallel in each of the following tests:

FIGS. 6a and 6b show the leakage current respectively the capacitance of a capacitor made from the powder of example 1 (comparison) at a temperature of 125° C. and a working voltage of 4 V during 5000 hours of operation.

Figure 7:
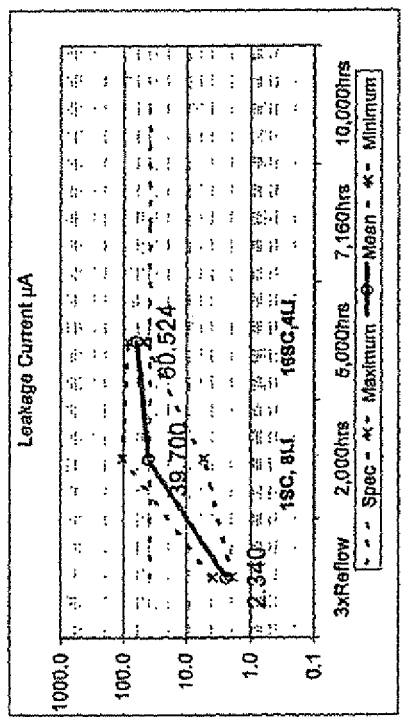
FIGS. 7a and 7b are graphical representations of the leakage current and capacitance at a working voltage of 4V, respectively, of a capacitor comprised of a powder in accordance with another embodiment of the invention.
Figure 7:
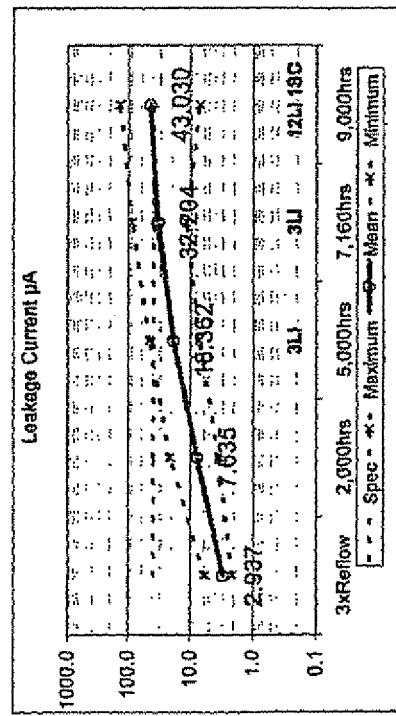

FIGS. 7a and 7b show the leakage current respectively the capacitance of a capacitor made from the powder of example 2 (N-doped) at a temperature of 125° C. and a working voltage of 4 V during 9000 hours of operation.

Figure 8:
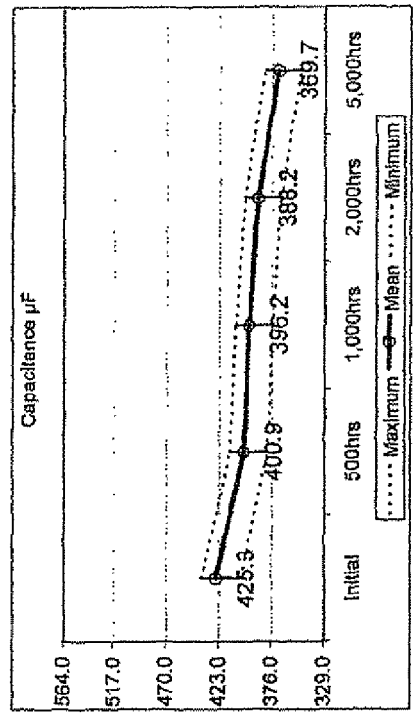
FIGS. 8a and 8b are graphical representations of the leakage current and capacitance at a working voltage of 2V, respectively, of a capacitor comprised of a powder in accordance with an embodiment of the invention.
Figure 8:
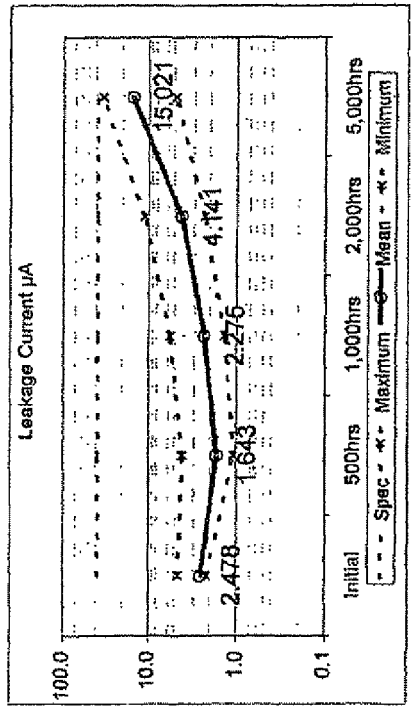

FIGS. 8a and 8b show the leakage current respectively the capacitance of a capacitor made from the powder of example 1 (comparison) at a temperature of 140° C. and a working voltage of 2 V during 5000 hours of operation.

Figure 9:
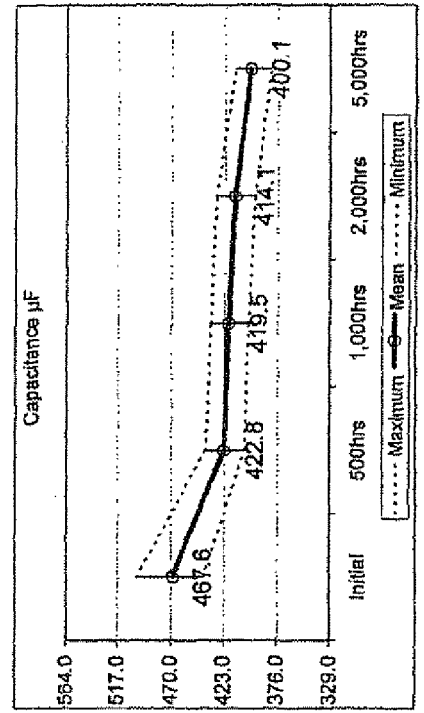
FIGS. 9a and 9b are graphical representations of the leakage current and capacitance at a working voltage of 2V, respectively, of a capacitor comprised of a powder in accordance with another embodiment of the invention.
Figure 9:
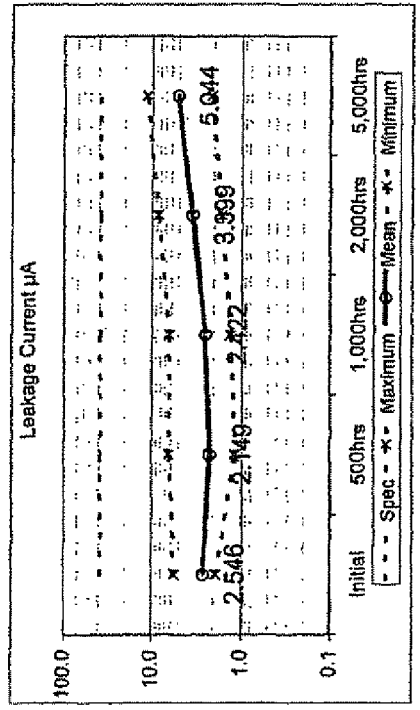

FIGS. 9a and 9b show the leakage current respectively the capacitance of a capacitor made from the powder of example 2 (N-doped) at a temperature of 140° C. and a working voltage of 2 V during 5000 hours of operation.

The invention claimed is:

1. A porous anode body suitable for use in a solid state capacitor, the porous anode body prepared by a process comprising providing a niobium suboxide powder comprising niobium suboxide particles having a bulk nitrogen content of 500 to 20,000 ppm, and agglomerating and coalescing the powder, wherein at least a portion of the nitrogen in the porous anode body comprises crystals selected from the group consisting of $Nb_2N$ crystals, niobium oxynitride crystals, and combinations thereof.

2. The porous anode body according to claim 1, wherein the niobium suboxide particles have a bulk nitrogen content of 1,000 to 8,000ppm.

3. The porous anode body according to claim 1, wherein at least a portion of the nitrogen comprises $Nb_2N$ crystals having a size sufficient to give a peak in $CuK_\alpha$-x-ray radiation at a 2Θ-angle of about 38.5°.

4. The porous anode body according to claim 3, wherein the $Nb_2N$ peak at a 2Θ-angle of about 38.5° has a height that is 2 to 25% of the height of a NbO peak at a 2Θ-angle of about 30°.

5. The porous anode body according to claim 3, wherein the $Nb_2N$ peak at a 2Θ-angle of about 38.5° has a half-value width of 0.05 and 0.2°.

6. The porous anode body according to claim 1, wherein the niobium suboxide particles comprise agglomerates of primary particles having a mean diameter of 0.1 to 1.5 μm.

7. The porous anode body according to claim 1, wherein the niobium suboxide has a formula $NbO_x$ wherein 0.7<x<1.3.

8. The porous anode body according to claim 7, wherein 1<x<1.033.

9. The porous anode body according to claim 1, wherein the anode body has an oxygen content of 14.5 to 15.1% by weight.

10. The porous anode body according to claim 1, wherein the niobium suboxide has a burning time of more than 5 min, as measured when 50g of the niobium suboxide are arranged in an area of 150×30 mm on a niobium sheet of 0.1 mm thickness and ignited at one end.

11. The porous anode body according to claim 1, wherein agglomerating and coalescing comprises molding and sintering.

12. An electrolyte capacitor comprising a porous anode body according to claim 1.

13. A solid state capacitor comprising a porous anode body according to claim 1.

14. The solid state capacitor according to claim 13, further comprising a dielectric layer disposed on a surface of the porous anode body, and a conductive cathode layer disposed on the dielectric layer.

15. The solid state capacitor according to claim 14, further comprising an anode terminal and a cathode terminal, and wherein the porous anode body is electrically connected to the anode terminal and the cathode layer is electrically connected to the cathode terminal.

16. The solid state capacitor according to claim 15, further comprising an insulating material encapsulating the capacitor, wherein a portion of a surface of the anode terminal and a portion of a surface of the cathode terminal are exposed.

17. An electronic device comprising a capacitor according to claim 13.

18. An electronic device comprising a capacitor according to claim 16.

19. A method comprising providing a niobium suboxide powder comprising niobium suboxide particles having a bulk nitrogen content of 500 to 20,000 ppm, and agglomerating and coalescing the powder to form a unitary porous anode body, wherein at least a portion of the nitrogen in the porous anode body comprises crystals selected from the group consisting of $Nb_2N$ crystals, niobium oxynitride crystals, and combinations thereof.

* * * * *